(12) United States Patent
Lin (10) Patent No.: US 7,611,112 B2
(45) Date of Patent: Nov. 3, 2009

(54) BEARING APPARATUS FOR PORTABLE ELECTRONIC DEVICE USED IN VEHICLE

(76) Inventor: Rocky Yi-Ping Lin, 9F.-5, No. 189, Sec. 2, Keelung Rd., Sinyi District, Taipei City 110 (TW)

( * ) Notice: Subject to any disclaimer, the term of this patent is extended or adjusted under 35 U.S.C. 154(b) by 155 days.

(21) Appl. No.: 11/866,551

(22) Filed: Oct. 3, 2007

(65) Prior Publication Data

US 2009/0090839 A1 Apr. 9, 2009

(51) Int. Cl.
*E04G 3/00* (2006.01)
(52) U.S. Cl. .............. 248/274.1; 248/918; 248/346.01; 248/284.1
(58) Field of Classification Search ............... 248/918, 248/346.01, 274.1, 284.1
See application file for complete search history.

(56) References Cited

U.S. PATENT DOCUMENTS

| | | | | |
|---|---|---|---|---|
| 5,673,628 A | * | 10/1997 | Boos | 108/44 |
| 5,769,369 A | * | 6/1998 | Meinel | 248/176.1 |
| 6,021,720 A | * | 2/2000 | Boos et al. | 108/44 |
| 6,491,276 B1 | * | 12/2002 | Belliveau | 248/372.1 |
| 6,604,720 B1 | * | 8/2003 | Wilson | 248/177.1 |
| 6,796,536 B1 | * | 9/2004 | Sevier, IV | 248/121 |
| 7,384,087 B2 | * | 6/2008 | Littlejohn | 296/37.1 |
| 2003/0218113 A1 | * | 11/2003 | Sullivan | 248/346.07 |
| 2007/0034753 A1 | * | 2/2007 | Lee | 248/121 |
| 2007/0131825 A1 | * | 6/2007 | Skrodzki | 248/177.1 |
| 2007/0145219 A1 | * | 6/2007 | Lin | 248/274.1 |
| 2007/0164176 A1 | * | 7/2007 | Liao | 248/176.3 |

FOREIGN PATENT DOCUMENTS

TW M293382 7/2006

* cited by examiner

*Primary Examiner*—J. Allen Shriver, II
*Assistant Examiner*—Michael McDuffie
(74) *Attorney, Agent, or Firm*—Chun-Ming Shih (57) ABSTRACT

A bearing apparatus for a portable electronic device used in vehicle includes a supporting frame, a bearing structure, a cooling fan, a first holding mechanism, and a second holding mechanism. The bearing structure is connected to the supporting frame and has a bearing plate. The first holding mechanism capable of being dismantled from the ground and connected to the bearing plate includes a front and rear moving arms set and a right and left moving arms set. The cooling fan and the second holding mechanism are respectively connected to the bearing plate. The second holding mechanism includes a front telescoping arm set and a rear telescoping arm set. Thereby, any electronic device can be stably abutted and fixed to the bearing plate, in corresponding to variously different sizes, by making appropriate adjustment.

16 Claims, 9 Drawing Sheets

BEARING APPARATUS FOR PORTABLE ELECTRONIC DEVICE USED IN VEHICLE

BACKGROUND OF THE INVENTION

1. Field of the Invention

The present invention generally relates to a bearing apparatus, in particular, to a bearing apparatus for portable electronic device used in vehicle.

2. Description of Prior Art

There are associated techniques of bearing apparatus (or frame) used in vehicle, as disclosed in Taiwanese Utility Model No. M293382 "Bearing Apparatus for Portable Electronic Device Used in Vehicle". This prior art is to provide a bearing apparatus for an electronic device (e.g., notebook computer) used in vehicle, where the electronic device is fixed onto the bearing apparatus by a rod structure bendable to provide the user with needed altitude and angle according to actual situation, thus a using state most suitable to the operation being reached.

However, although the configuration of the prior art has reached a certain degree of practicality, the bearing apparatus is only applicable to few kinds of electronic devices that are suitable to be held by a number of front and rear fixtures and Velcro, which can not provide enough functions of exchange and extension though, thus the adoptability being still quite limited. Furthermore, the using conditions in vehicle are mostly higher than common ones, in particular, when a car is turning and braking, which can usually cause the electronic device falling and damaged, if the electronic device is only held partially at front and rear parts. In order to fulfill specific requirements requested by different customers, manufactures have to produce electronic devices with different profiles and sizes, according to which it is usually needed to purchase respective supporting apparatuses with different specifications. Therefore, it not only causes inconvenience to the user, but also increases the purchasing cost. These shortcomings of prior arts are all needed to be improved urgently.

Accordingly, aiming to solve aforementioned shortcomings, after a substantially devoted study, in cooperation with the application of relatively academic principles, the inventor finally proposes the present invention that is designed reasonably to possess the capability to improve the prior arts significantly.

SUMMARY OF THE INVENTION

The invention is mainly to provide a bearing apparatus for portable electronic device used in vehicle. The bearing apparatus includes a first holding mechanism and a second holding mechanism, which can be separately or cooperatively used. The bearing apparatus not only can be used for electronic devices with different profiles and sizes, but also can make carried electronic device firmly abutted and fixed at a supporting plate in a way, such that the using convenience and applying scope of the bearing apparatus are enhanced in great scale.

The invention is to provide a bearing apparatus for portable electronic device used in vehicle. The bearing apparatus includes a supporting frame, a bearing structure, a cooling fan, a first holding mechanism, and a second holding mechanism. The bearing structure is connected to the supporting frame and has a bearing plate, on which a ventilating trough is arranged, and a plurality of guiding parts are respectively arranged at the outer surroundings of the ventilating trough. The cooling fan is positioned at the ventilating trough of the bearing plate. The first holding mechanism capable of being dismantled from the ground is connected to the bearing plate and has a set of front and rear moving arms respectively connected to the front and rear sides of the bearing plate, and a set of left and right moving arms respectively connected to the left and right sides of the bearing plate. The front and rear moving arm sets respectively include: a clipping-and-abutting arm inter-cooperated with the guiding part of the bearing plate; and, a turning knob arranged through the bearing plate and interconnected to the clipping-and-abutting arm. The front and rear moving arm sets can be adjusted and moved in a back-and-forth direction at the bearing plate. The left and right moving arm sets respectively includes: a clipping-and-abutting arm inter-cooperated with the guiding part of the bearing plate; and, a turning knob arranged through the bearing plate and interconnected to the clipping-and-abutting arm. The left and right moving arm sets can be adjusted and moved in a left-and-right direction at the bearing plate. The second holding mechanism is connected to the bearing plate and has a front telescoping arm set and a rear telescoping arm set. The front telescoping arm set further includes: a front telescoping arm connected to the front of the bearing plate; a swinging arm connected to the front telescoping arm; and, a front abutting plate connected to the swinging arm. On the other hand, the rear telescoping arm set includes: a rear telescoping arm connected to the rear of the bearing plate; and, a rear abutting plate connected to the rear telescoping arm.

The invention is also to provide a bearing apparatus for portable electronic device used in vehicle. The bearing apparatus has a cooling fan arranged under the bearing plate for processing a heat dissipating function to an electronic device placed on the bearing plate.

BRIEF DESCRIPTION OF DRAWING

The features of the invention believed to be novel are set forth with particularity in the appended claims. The invention itself, however, may be best understood by reference to the following detailed description of the invention, which describes several exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, being not used to limit its executing scope. Any equivalent variation and modification made according to appended claims is all covered by the claims claimed by the present invention.

Figure 1:
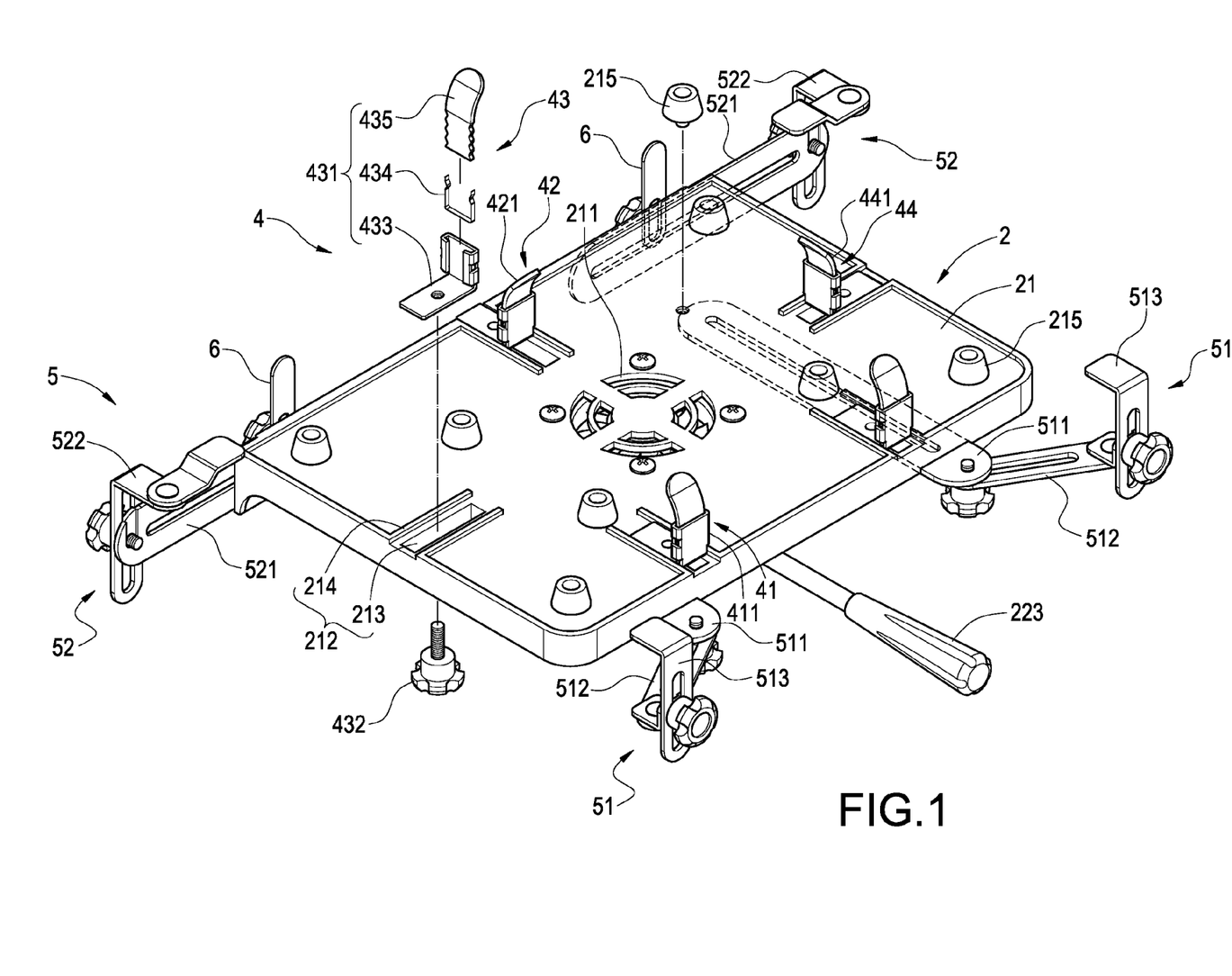
FIG. 1 is an explosive, perspective view of partial elements of the present invention.
Figure 2:
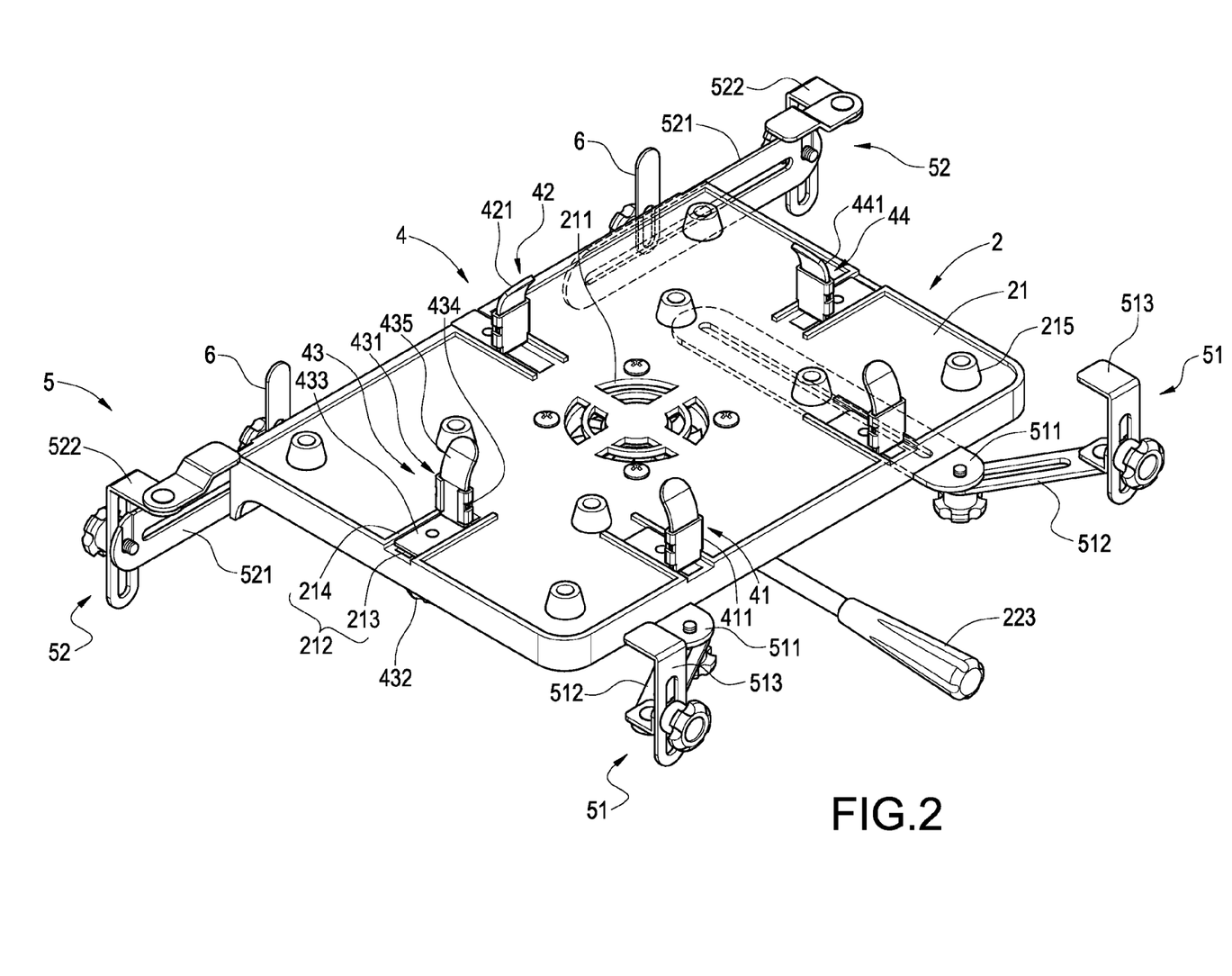
FIG. 2 is an assembled illustration of the present invention.
Figure 3:
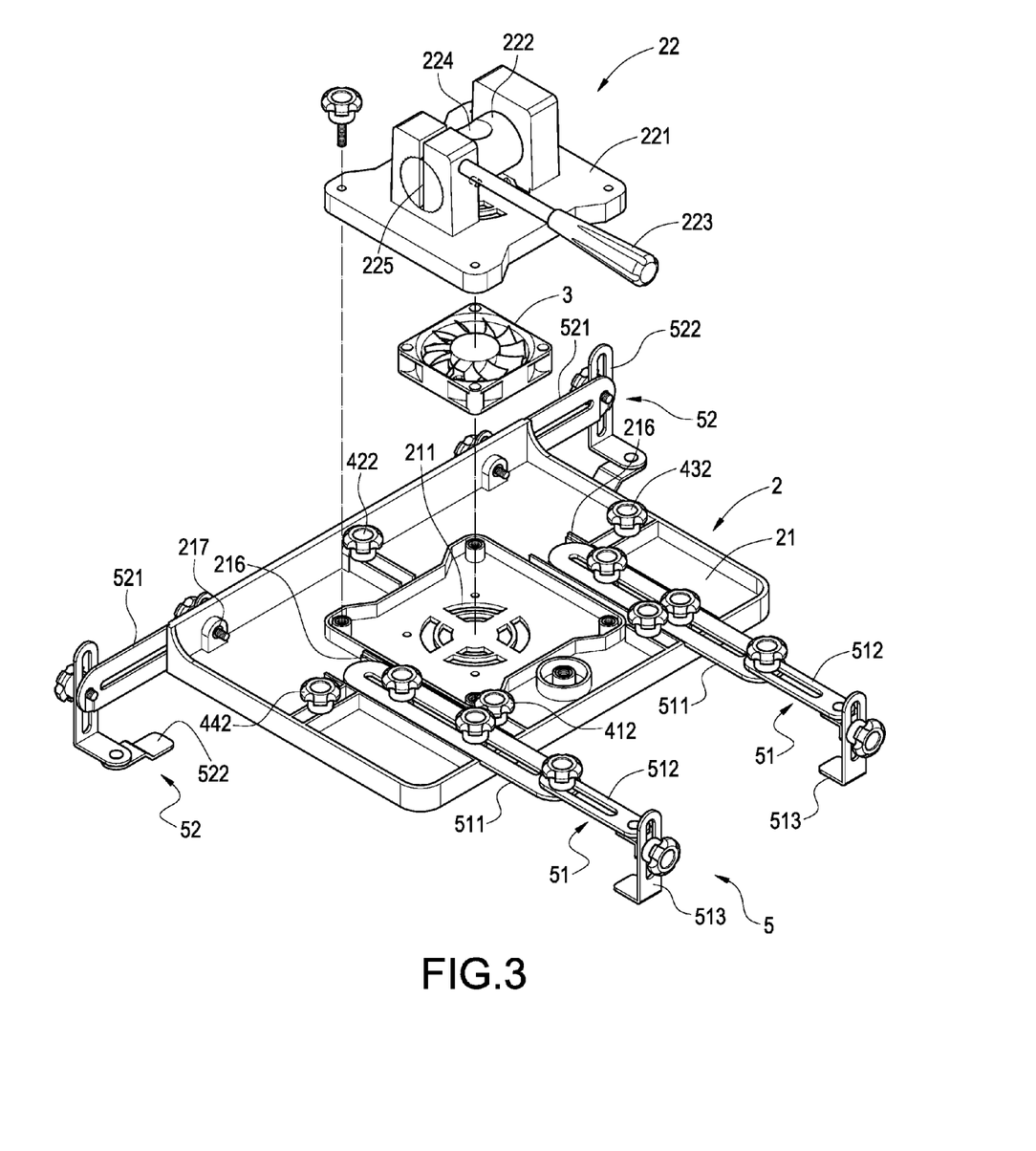
FIG. 3 is an explosive, perspective view of partial elements of the present invention viewed from another angle.
Figure 4:
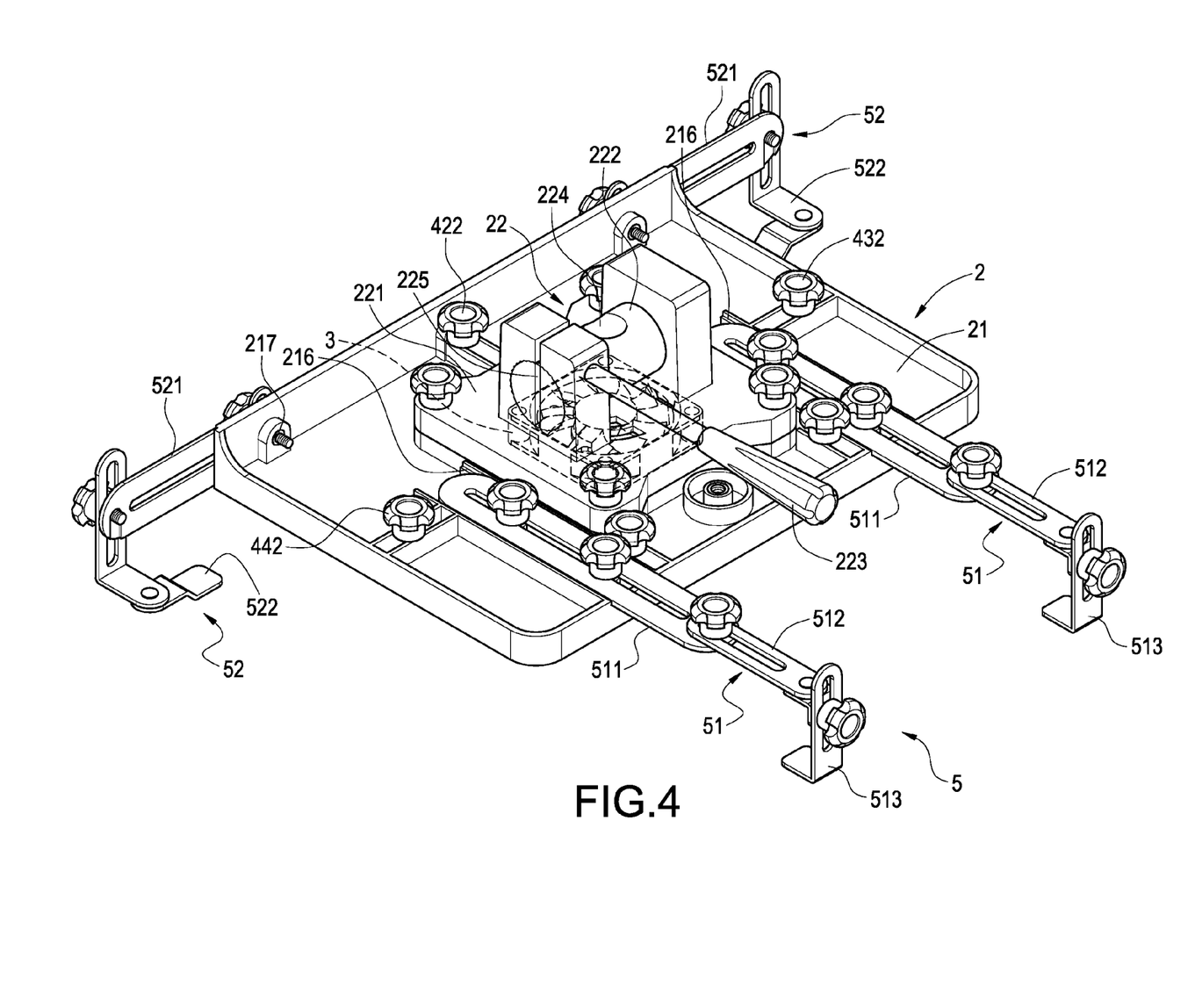
FIG. 4 is an assembled illustration of the present invention viewed from another angle.
Figure 5:
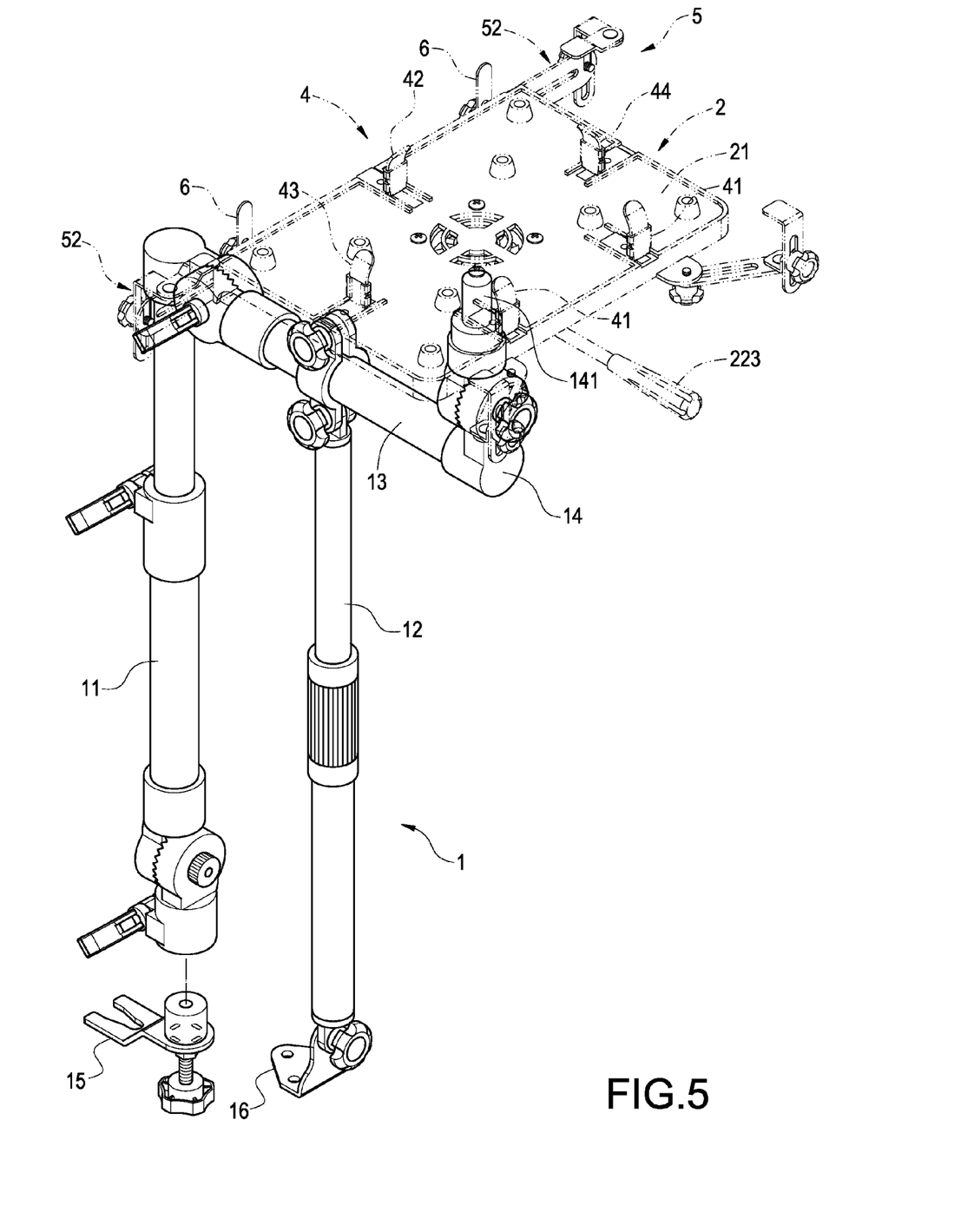
FIG. 5 an assembled illustration of the present invention, in which a supporting frame is connected.

Please refer to FIG. 1 to FIG. 4. The invention is to provide a bearing apparatus for portable electronic device used in vehicle, the bearing apparatus mainly including: a supporting frame 1 (as shown in FIG. 5), a bearing structure 2, a cooling fan 3, a first holding mechanism 4, and a second holding mechanism 5.

In this preferable embodiment, the bearing structure 2 includes a bearing plate 21 and a rotating set 22 (as shown in FIG. 3). The bearing plate 21 is substantially shown as a rectangular body, a center of which is arranged bar-shaped ventilating troughs 211, at outer surroundings of which a plurality of guiding parts 212 are arranged on the bearing plate 21. In addition, the guiding part 212 is constructed of a guiding trough 213 and two guiding rails 214 respectively formed at two sides of the guiding trough 213. At four corners of the bearing plate 21 and at outer surroundings of the ventilating trough 211, four cone-shaped bearing blocks 215 are respectively connected. In this case, the rotating set 22 includes: a fixing seat 221 screwed and connected in corresponding to a bottom face of the bearing plate 21; a pivot 222 for pivoting the fixing seat 221; and, a rotating rod 223 for controlling the holding tightness between the pivot 222 and the fixing seat 221. On the other hand, a fitting hole 224 is arranged at a radial center of the pivot 222, one side of which is arranged a sectional trough 225 communicating the fitting hole 224, and which may be held by tightening the rotating rod 223 in a rotary motion. In addition, at bottom face of the bearing plate 21, two guiding troughs 216 respectively vertical to the front side face thereof are formed, and two perforations 217 are arranged at the rear side face thereof.

Figure 6:
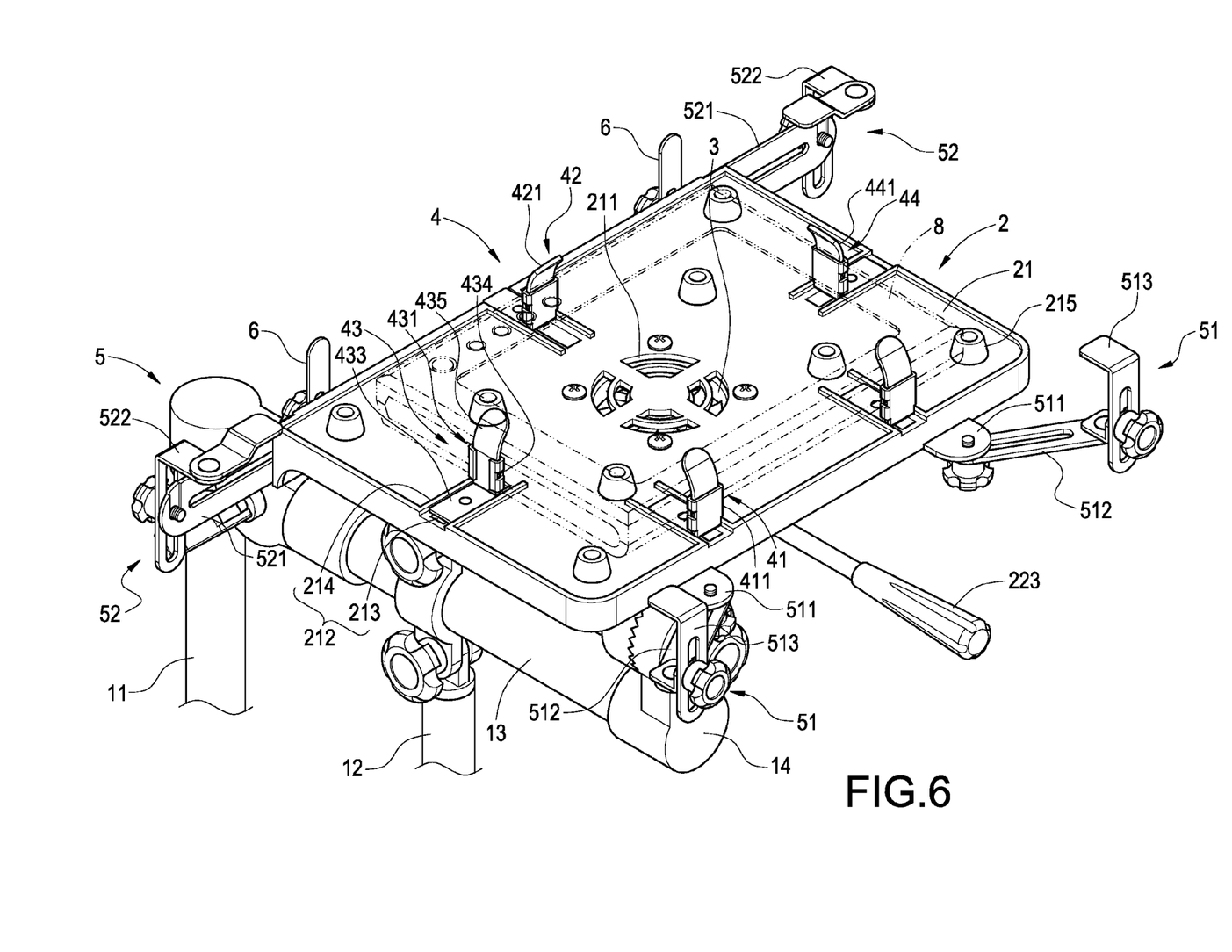
FIG. 6 is an assembled illustration, in which the present invention is applied to a flat plate computer.

The cooling fan 3 is fixed and connected, in corresponding to the position of the ventilating trough 211 of the bearing plate, by a number of fixing elements (e.g., screw), for proceeding a cooling function to a Tablet PC (Tablet Personal Computer) 8 placed on the bearing plate 21, as shown in FIG. 6.

The first holding mechanism 4, capable of being dismantled from ground and connected to the bearing plate 21, includes: two front and rear moving arm sets 41, 42; and, two left and right moving arm sets 43, 44. Respectively connected to the front and rear sides of the bearing plate 21, the front and rear moving arm sets 41, 42 also respectively have a clipping-and-butting arm 411, 421 inter-cooperative with the guiding parts 212 of the bearing plate 21 and a screw-connecting element 412, 422 arranged through the bearing plate 21 and interconnected to each clipping-and-abutting arms 411, 421. In this case, the screw-connecting elements 412, 422 respectively are a rotating knob having a bolt. The front and rear moving arm sets 41, 42 can be adjusted and moved on the bearing plate 21 in a back-and-forth direction. On the other hand, the left and right moving arm sets 43, 44, respectively connected to the left and right sides of the bearing plate 21, also respectively have a clipping-and-abutting arm 431, 441 inter-cooperative with the guiding parts 212 of the bearing plate 21 and a screw-connecting element 432, 442 arranged through the bearing plate 21 and interconnected to each clipping-and-abutting arm 431, 441. In this case, the screw-connecting elements 432, 442 also respectively are a rotating knob having a bolt. The left and right moving arm sets 43, 55 can be adjusted and moved on the bearing plate in a left-and-right direction. In addition, the clipping-and-abutting arm 431 includes: an "L"-shaped plate 433; a pressing plate 434 accommodated in one side of the "L"-shaped plate 433; and, a leaf spring 435 clipped-and-abutted between the "L"-shaped plate 433 and the pressing plate 434. Other clipping-and-abutting arms 411, 421, 441, identical to the clipping-and-abutting arm 431, are not repetitiously described herein.

The second fixing mechanism 5 is connected to the bearing plate 21, and in this preferable embodiment, includes two front telescoping arm sets 51 and two rear telescoping arms sets 52. The front telescoping arm set 51 further includes: a front telescoping arm 511 accommodated and connected the guiding trough 216 of the bearing plate 21; a swinging arm 512 connected the front telescoping arm 511; and, a front abutting plate 513 connected the swinging arm 512. On the other hand, the rear telescoping arm set 52 includes: a perforation 217 in corresponding to the bearing plate 21; a rear telescoping arm 521 connected fixedly by a fixing element arranged through; and, a rear abutting plate 522 connected the rear telescoping arm 521.

In addition, the bearing apparatus of the invention further includes a rear catch 6 connected fixedly in corresponding to the position of the perforation 217 of the bearing plate 21, thereby forming a restricting function to the rear side face of the Tablet PC 8.

Please refer to FIG. 5, which is an assembled illustration for the present invention connected to the supporting frame 1. The supporting frame 1 is to provide a connection to the bearing structure 2 and is mainly assembled by: a main rod 11; a sub-rod 12; a cross rod 13 connected to the top sides of the main rod 11 and the sub-rod 12; and, a rotating seat 14 connected to the cross rod 13 at one side far away the main rod 11. Furthermore, two fixing seats 15, 16 are respectively connected to the bottom sides of the main rod 11 and the sub-rod 12 for being connected fixedly under a seat of vehicle or at any appropriate position of interior (not shown in the figures). After the seat is partially dismantled, a fork opening of the fixing seat 15 is fitted to a bolt under the seat for being fixedly connected. In order to avoid a relatively gliding motion generated between the piece body of the fixing seat 15 and the tube body, at the contacted side faces of which it is possible to respectively form a capsule-shaped indent and bulger that are abutted and positioned correspondingly and interactively. Again, it is possible to obtain a better fixing effect by abutting a rotating knob under the fixing seat 15 to be connected onto a bottom plate of the vehicle. As shown in FIG. 4, a projecting axle 141, extended above the rotating seat 14, is to fix and connect a fitting hole 224 of the pivot 222. The pivot 222 and the projecting axle 141 may be positioned fixedly by rotating the rotating rod 223 tightly.

Please refer to FIG. 6, which is an assembled illustration of the present invention applied to a flat-plate computer. By assembling the aforementioned elements, the bearing apparatus of the invention may be applied to a small Tablet PC 8 to be placed thereon. Since the profile and size of the Tablet PC 8 is far smaller than the outer surrounding size of the bearing plate 21, the second holding mechanism 4 is applied for the fixing procedure only. Firstly, a heat sink of the Tablet PC 8 is arranged at the positions of the ventilating trough 211 and the cooling fan 3 of the bearing plate 21 correspondingly. Secondly, each screw-connecting elements 412, 422, 432, 442 of moving arm sets 41, 42, 43, 44 is turned loose. Thirdly, each clipping-and-abutting arms 411, 421, 431, 441 is pushed toward the surroundings of the Tablet PC 8 and abutted thereat. Finally, each screw-connecting elements 412, 422, 432, 442 is screwed up. Thereby, the Tablet PC 8 may be fixedly connected to the bearing plate 21 firmly.

Figure 7:
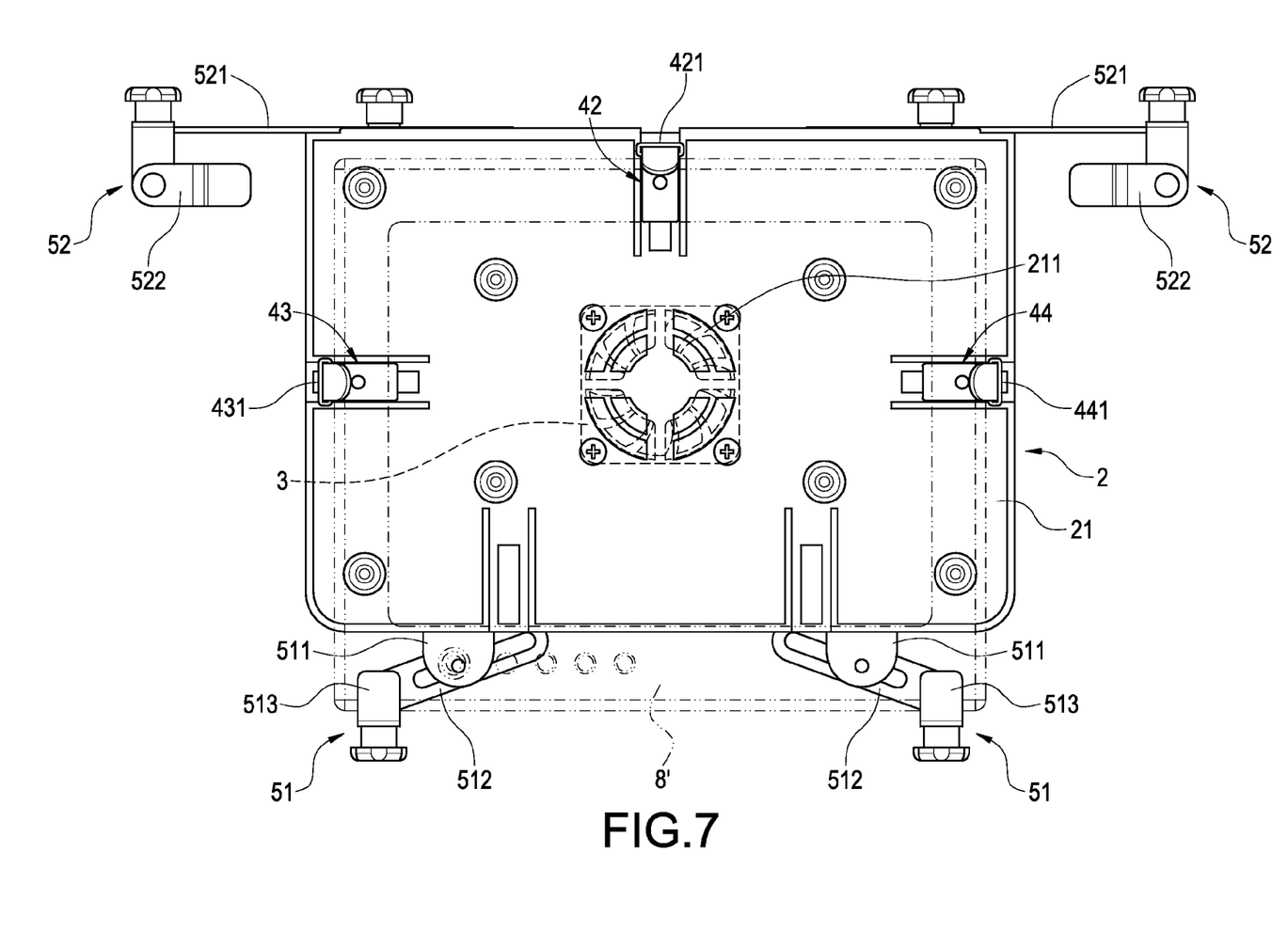
FIG. 7 is a top view illustrating the present invention applied to another flat plate computer.

Please refer to FIG. 7, which is a top view of the present invention applied to another Tablet PC. For a middle Tablet PC 8' with a profile size larger than the outer surrounding size of the bearing plate 21, the first holding mechanism 4 and the second holding mechanism 5 are cooperatively applied. In this case, the rear moving arm set 42 and the left, right moving arm sets 43, 44 of the first holding mechanism 4 and two front telescoping arm sets 51 of the second holding mechanism 5 are used cooperatively to proceed a fixedly positioning function to the Tablet PC 8'.

Figure 8:
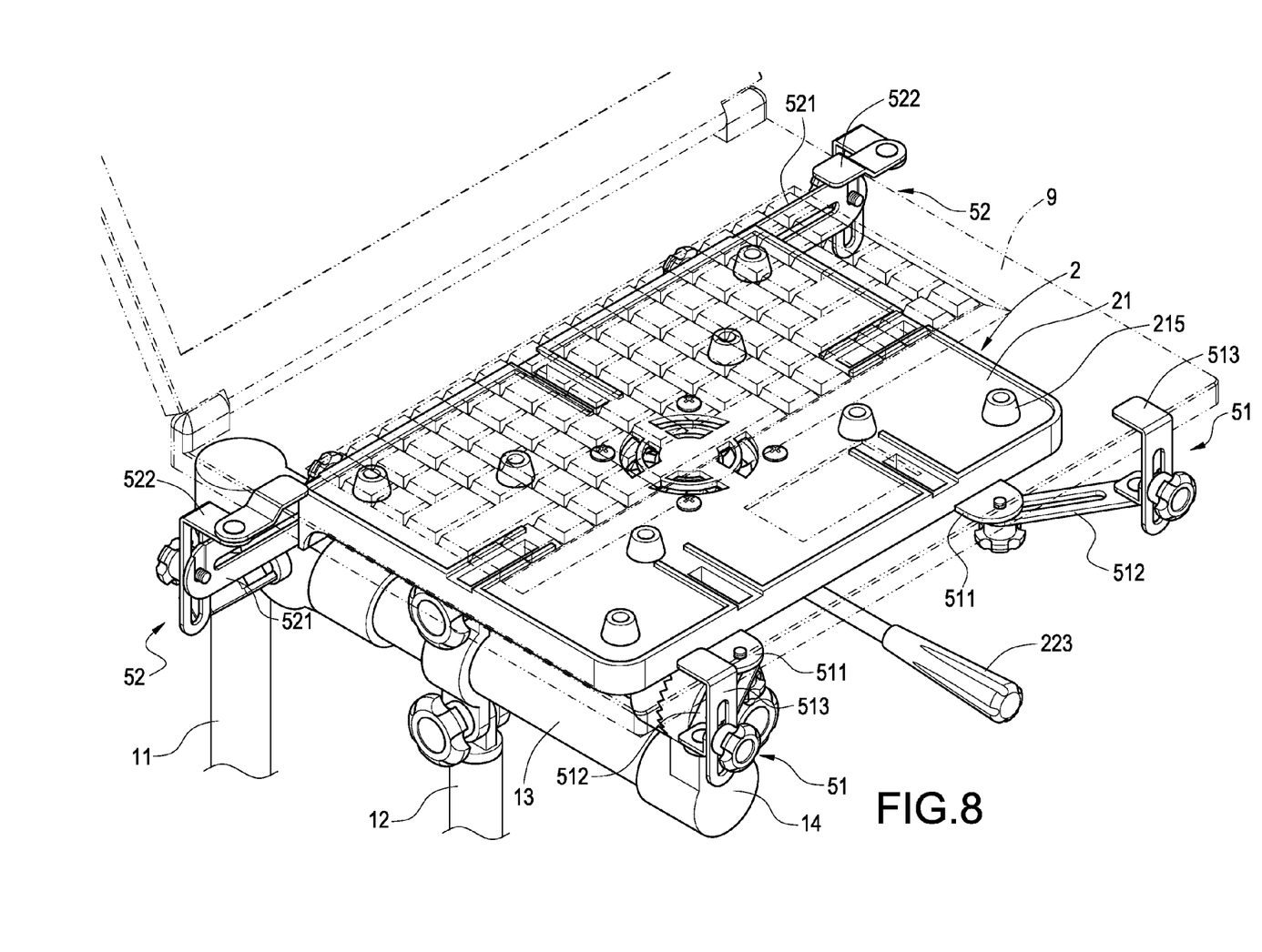
FIG. 8 is an assembled illustration, in which the present invention is applied to a notebook computer.

Please refer to FIG. 8, which is an assembled illustration of the present invention applied to a notebook computer. As shown in this case, the bearing apparatus of the invention not only has the configurations of aforementioned embodiments associated with a Tablet PC 8, 8', but also has a configuration applied to a notebook computer 9 to be placed thereon. Firstly, with the dismantling characterization of the first holding mechanism of the present invention, each moving arm sets 41, 42, 43, 44 is dismantled during usage. Secondly, the front side and two lateral sides of the notebook computer 9 of large size are fixedly positioned with two front telescoping arm sets 51 and two rear telescoping arm sets 52. Thirdly, the front abutting plate 513 of the front telescoping arm set 51 may make a rotational swing of few angles relative to the swinging arm 512. Thereby, when interference is generated between the abutting plate 513 and the plugging-in ports of the notebook computer 9 (not shown in the figures), it is possible to effectively adjust the aforementioned position to further enhance its applying convenience.

Figure 9:
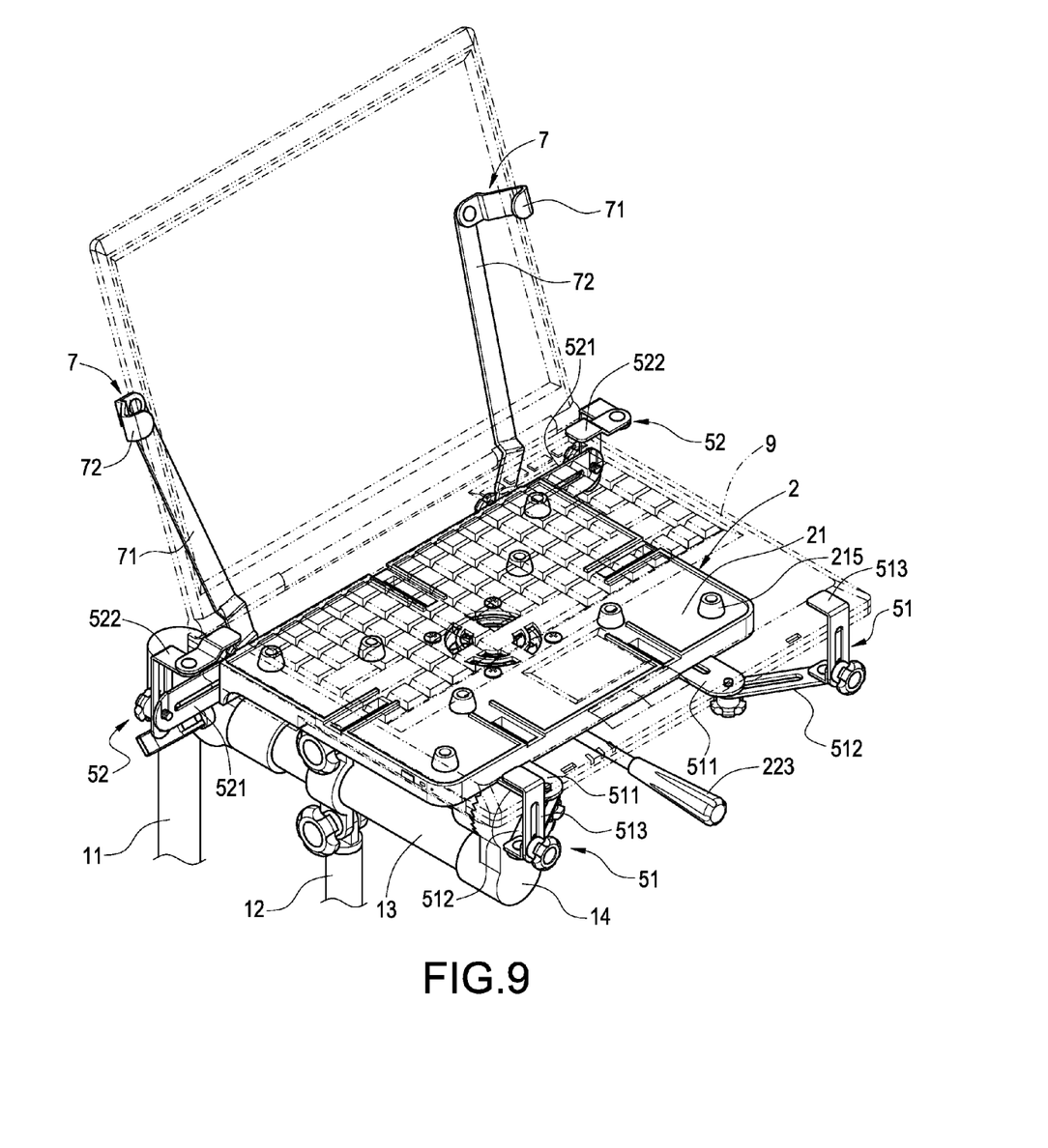
FIG. 9 is an assembled illustration, in which another embodiment of the present invention is applied to a notebook computer.

Please refer to FIG. 9, which is an assembled illustration, in which a further embodiment of the present invention is applied to a notebook computer. Since the bearing apparatus of the invention is fixedly connected to the interior of a vehicle, it is unavoidable to generate vibration and shake during the driving procedure of the vehicle. Besides, the machine body and display of the notebook computer 9 are all pivoted, so this embodiment further includes a set of laterally fixing frames 7, which are respectively connected to the rear of the bearing plate 21. This laterally fixing frame 7 mainly includes a fixing arm 71 and a clipping-and-abutting piece 72 connected to the top side of the fixing arm 71. The bottom side of the fixing arm 71 is fixed by applying a screw-connecting element arranged through the perforation 217 of the bearing plate 21, as shown in FIG. 3, while each clipping-and-abutting piece 72 is respectively fixedly clipped onto the display of the notebook computer 9 in a way, such that the display is positioned more firmly without generating a shaking phenomenon. Thereby, the rotating axles connected in the notebook computer 9 can be effectively avoided from being damaged because of the vehicle's shake or vibration.

Summarizing aforementioned description, the invention is an indispensable product of novelty indeed, which may positively reach the expected usage objective for solving the drawbacks of the prior arts, and which extremely possesses the innovation and progressiveness for completely fulfilling the applying merits of new type patent, according to which the invention is thereby applied. Please examine the application carefully and grant it as a formal patent for protecting the rights of the inventor.

However, the aforementioned description is only a number of preferable embodiments according to the present invention, being not used to limit the patent scope of the invention, so equivalently structural variation made to the contents of the present invention, for example, description and drawings, is all covered by the claims claimed thereinafter.

What is claimed is:

1. A bearing apparatus for a portable electronic device used in a vehicle, including:
   a supporting frame;
   a bearing structure, connected to the supporting frame and having a bearing plate, on which a ventilating trough is arranged, and a plurality of guiding parts are separately arranged at the outer surroundings of the ventilating trough;
   a cooling fan, fixed and connected in corresponding to a position of the ventilating trough of the bearing plate;
   a first holding mechanism, capable of being dismantled from the ground, connected to the bearing plate, including:
      a set of front and rear moving arms, respectively connected to front and rear sides of the bearing plate, capable of being adjusted and moved in a back-and-forth direction at the bearing plate, respectively including a clipping-and-abutting arm inter-cooperated with the guiding part of the bearing plate; and a screw-connecting element arranged through the bearing plate and interconnected to the clipping-and-abutting arm; and
      a set of left and right moving arms, respectively connected to left and right sides of the bearing plate, capable of being adjusted and moved in a left-and-right direction at the bearing plate, respectively including a clipping-and-abutting arm inter-cooperated with the guiding part of the bearing plate; and a screw-connecting element arranged through the bearing plate and interconnected to the clipping-and-abutting arm; and
   a second holding mechanism, connected to the bearing plate, including:
      a front telescoping arm set, including a front telescoping arm connected to the front of the bearing plate; a swinging arm connected to the front telescoping arm; and a front abutting plate connected to the swinging arm; and
      a rear telescoping arm set, including a rear telescoping arm connected to the rear of the bearing plate; and a rear abutting plate connected to the rear telescoping arm,
   wherein the supporting frame comprises a main rod, a sub-rod, a cross rod connected to a top side of the main rod and the sub-rod respectively, and a rotating seat connected to the cross rod at one side far away the main rod, and
   wherein a projecting axle is extended above the rotating seat, while the bearing structure further has a rotating set connected to the bearing set including a pivot, at a radial direction of which a fitting hole and a sectional trough fitted to the fitting hole are arranged thereon, the projecting axle being fitted to the fitting hole and connected.

2. The bearing apparatus for a portable electronic device used in a vehicle according to claim 1, wherein the guiding part comprises a guiding trough and two guiding rails respectively formed at two sides of the guiding trough.

3. The bearing apparatus for a portable electronic device used in a vehicle according to claim 2, wherein the clipping-and-abutting arm includes an "L"-shaped plate; a pressing plate accommodated in one side of the "L"-shaped plate; and a leaf spring clipped-and-abutted between the "L"-shaped plate and the pressing plate.

4. The bearing apparatus for a portable electronic device used in a vehicle according to claim 1, wherein the screw-connecting element is a rotating knob having a bolt.

5. The bearing apparatus for a portable electronic device used in a vehicle according to claim 1, wherein a guiding trough is formed at a bottom face of the bearing plate, at rear side of which a perforation is arranged; wherein the front telescoping arm is accommodated and fixed in the guiding trough, while the rear telescoping arm is fixed and connected in corresponding to the perforation.

6. The bearing apparatus for a portable electronic device used in a vehicle according to claim 5, further including a rear catch, which is fixed and connected in corresponding to a position of the perforation of the bearing plate.

7. The bearing apparatus for a portable electronic device used in a vehicle according to claim 5, further including a laterally fixing frame, which is fixed and connected in corresponding to the position of the perforation of the bearing plate.

8. The bearing apparatus for a portable electronic device used in a vehicle according to claim 7, wherein the laterally fixing frame comprises a fixing arm connected to the bearing plate and a clipping-and-abutting piece connected to one side of the fixing arm.

9. A bearing apparatus for a portable electronic device used in a vehicle, including:
    a supporting frame;
    a bearing structure, connected to the supporting frame and having a bearing plate, on which a ventilating trough is arranged, and a plurality of guiding parts are separately arranged at the outer surroundings of the ventilating trough;
    a cooling fan, fixed and connected in corresponding to a position of the ventilating trough of the bearing plate;
    a first holding mechanism, capable of being dismantled from the ground, connected to the bearing plate, including:
        a set of front and rear moving arms, respectively connected to front and rear sides of the bearing plate, capable of being adjusted and moved in a back-and-forth direction at the bearing plate, respectively including a clipping-and-abutting arm inter-cooperated with the guiding part of the bearing plate; and a screw-connecting element arranged through the bearing plate and interconnected to the clipping-and-abutting arm; and
        a set of left and right moving arms, respectively connected to left and right sides of the bearing plate, capable of being adjusted and moved in a left-and-right direction at the bearing plate, respectively including a clipping-and-abutting arm inter-cooperated with the guiding part of the bearing plate; and a screw-connecting element arranged through the bearing plate and interconnected to the clipping-and-abutting arm; and
    a second holding mechanism, connected to the bearing plate, including:
        a front telescoping arm set, including a front telescoping arm connected to the front of the bearing plate; a swinging arm connected to the front telescoping arm; and a front abutting plate connected to the swinging arm; and
        a rear telescoping arm set, including a rear telescoping arm connected to the rear of the bearing plate; and a rear abutting plate connected to the rear telescoping arm,
    wherein the guiding part comprises a guiding trough and two guiding rails respectively formed at two sides of the guiding trough, and
    wherein the clipping-and-abutting arm includes an "L"-shaped plate; a pressing plate accommodated in one side of the "L"-shaped plate; and a leaf spring clipped-and-abutted between the "L"-shaped plate and the pressing plate.

10. The bearing apparatus for a portable electronic device used in a vehicle according to claim 9, wherein the supporting frame comprises a main rod, a sub-rod, a cross rod connected to a top side of the main rod and the sub-rod respectively, and a rotating seat connected to the cross rod at one side far away the main rod.

11. The bearing apparatus for a portable electronic device used in a vehicle according to claim 10, wherein a projecting axle is extended above the rotating seat, while the bearing structure further has a rotating set connected to the bearing set including a pivot, at a radial direction of which a fitting hole and a sectional trough fitted to the fitting hole are arranged thereon, the projecting axle being fitted to the fitting hole and connected.

12. The bearing apparatus for a portable electronic device used in a vehicle according to claim 9, wherein the screw-connecting element is a rotating knob having a bolt.

13. The bearing apparatus for a portable electronic device used in a vehicle according to claim 9, wherein a guiding trough is formed at a bottom face of the bearing plate, at rear side of which a perforation is arranged; wherein the front telescoping arm is accommodated and fixed in the guiding trough, while the rear telescoping arm is fixed and connected in corresponding to the perforation.

14. The bearing apparatus for a portable electronic device used in a vehicle according to claim 13, further including a rear catch, which is fixed and connected in corresponding to a position of the perforation of the bearing plate.

15. The bearing apparatus for a portable electronic device used in a vehicle according to claim 13, further including a laterally fixing frame, which is fixed and connected in corresponding to the position of the perforation of the bearing plate.

16. The bearing apparatus for a portable electronic device used in a vehicle according to claim 15, wherein the laterally fixing frame comprises a fixing arm connected to the bearing plate and a clipping-and-abutting piece connected to one side of the fixing arm.

* * * * *